(12) United States Patent
Williams et al.

(10) Patent No.: US 7,474,249 B1
(45) Date of Patent: Jan. 6, 2009

(54) SYSTEMS AND METHODS FOR DEDICATING POWER TO A RADAR MODULE

(75) Inventors: James D. Williams, Evergreen, CO (US); Henry G. Fuchs, Evergreen, CO (US); Timothy W. Harvey, Colorado Springs, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 112 days.

(21) Appl. No.: 11/202,946

(22) Filed: Aug. 12, 2005

Related U.S. Application Data

(60) Provisional application No. 60/600,937, filed on Aug. 12, 2004.

(51) Int. Cl.
*G01S 13/90* (2006.01)
(52) U.S. Cl. .................................. 342/25 R; 342/26 A
(58) Field of Classification Search ................ 342/25 R
See application file for complete search history.

(56) References Cited

U.S. PATENT DOCUMENTS

| | | | | | |
|---|---|---|---|---|---|
| 4,490,668 | A | * | 12/1984 | Sterzer | 322/2 R |
| 5,122,802 | A | * | 6/1992 | Marin | 342/13 |
| 5,204,809 | A | * | 4/1993 | Andresen | 363/132 |
| 5,530,446 | A | * | 6/1996 | Filipek | 342/13 |
| 6,104,759 | A | * | 8/2000 | Carkner et al. | 375/295 |
| 6,137,280 | A | * | 10/2000 | Ackermann et al. | 323/354 |
| 6,184,656 | B1 | * | 2/2001 | Karunasiri et al. | 320/119 |
| 6,369,545 | B1 | | 4/2002 | Williams et al. | 320/101 |
| 6,394,395 | B1 | | 5/2002 | Poturalski et al. | 244/173 |
| 6,417,783 | B1 | * | 7/2002 | Gabler et al. | 340/933 |
| 6,504,497 | B2 | * | 1/2003 | Jang et al. | 341/125 |
| 6,590,150 | B1 | * | 7/2003 | Kiefer | 136/258 |
| 6,636,416 | B2 | * | 10/2003 | Li et al. | 361/306.1 |
| 6,801,146 | B2 | * | 10/2004 | Kernahan et al. | 341/122 |
| 6,923,249 | B1 | * | 8/2005 | Porter et al. | 165/104.14 |
| 7,084,611 | B2 | * | 8/2006 | Kirchner et al. | 323/222 |
| 7,327,638 | B2 | * | 2/2008 | Nagata | 368/64 |

(Continued)

OTHER PUBLICATIONS

Boretz, John F. "Space Power For Laser Radar Sensor System". IEEE Aerospace and Electronic Systems Magazine vol. 5. Issue 3. Mar. 1990. pp. 3-8.*

(Continued)

*Primary Examiner*—Thomas H Tarcza
*Assistant Examiner*—Matthew M Barker
(74) *Attorney, Agent, or Firm*—McDermott Will & Emery LLP

(57) ABSTRACT

Systems and methods presented herein are generally directed to providing power to a radio frequency module of a radar antenna. For example, a system comprises a dedicated power cell that supplies a power signal and includes a dedicated solar power module that generates electrical energy for the power signal. The system also comprises a dedicated signal conditioner coupled to the power cell and to the radio frequency module, the signal conditioner conditioning the power signal for use by the radio frequency module. The radio frequency module receives conditioned power from the signal conditioner to use in processing a radio frequency signal. The radio frequency module may be a Synthetic Aperture Radar ("SAR") that comprises one or more radiating elements to transmit pulsed electromagnetic energy for use in radar processing. The SAR may also comprise a receiver that receives the pulsed electromagnetic energy reflected from a target.

18 Claims, 11 Drawing Sheets

U.S. PATENT DOCUMENTS

| | | | | |
|---|---|---|---|---|
| 2003/0132739 A1* | 7/2003 | Telefus et al. | | 323/284 |
| 2004/0145515 A1* | 7/2004 | Hall | | 342/175 |
| 2004/0252046 A1* | 12/2004 | Mork et al. | | 342/29 |
| 2005/0062605 A1* | 3/2005 | Sutphin | | 340/539.26 |
| 2005/0184883 A1* | 8/2005 | Graham | | 340/917 |
| 2008/0246507 A1* | 10/2008 | Gunn et al. | | 324/771 |

OTHER PUBLICATIONS

Maskell, Craig A. "Electrical Power on a 30 kW Space-Based Radar Satellite". IEEE Aerospace and Electronic Systems Magazine. vol. 7, Issue 1, Jan. 1992. pp. 46-50.*

Singh, Pritpal et al. "Fuzzy Logic-Based Solar Charge Controller for Microbatteries". Plotovoltaic Specalists Conference, 2000. Published Sep. 15-22, 2000. pp. 1726-1729.*

* cited by examiner

SYSTEMS AND METHODS FOR DEDICATING POWER TO A RADAR MODULE

CROSS REFERENCE TO RELATED APPLICATIONS

This patent application claims priority to U.S. Provisional Patent Application No. 60/600,937 (filed Aug. 12, 2004) and entitled "ICU Power Circuit (PC)", the entire contents of which are hereby incorporated by reference.

BACKGROUND

1. Field of the Invention

The invention relates in general to providing electrical power for radar modules and more specifically to decentralizing power distribution by providing dedicated power cells to the radar modules.

2. Discussion of the Related Art

Radar systems, such as Synthetic Aperture Radar ("SAR") systems configured aboard satellites, are often supplied electrical power by a centralized power distribution system. For example, a satellite may be configured with a plurality of solar panels to generate electrical energy. Each of the solar panels, via individual photovoltaic cells or "solar cells", receives and converts solar energy to electrical energy. The electrical energy is transferred to a centralized power distribution system which stores the electrical energy in batteries.

The centralized power distribution system transfers electrical energy from the batteries to various components aboard the satellite that require electrical energy to operate. An example of one such component includes a radar system. The radar may consume electrical energy to generate electromagnetic pulses towards a scene of interest. The radar may also consume electrical energy as reflected pulses are received by the radar. For example, the radar may include a receiver that receives reflected pulses and converts those pulses to digital data. This reception and conversion of the reflected pulses also consumes electrical energy.

To implement the functions of transmitting and receiving electromagnetic pulses, radars typically possess a plurality of sensitive electronic components configured as transmit/receive modules. For example, some radars, such as SARs, use a plurality of transmit/receive modules to transmit electromagnetic pulses. Each of these modules typically includes sensitive electronics that consume a significantly smaller fraction of the overall electrical energy stored with the centralized power distribution system (e.g., typically, low voltage current of about 3 to 4 volts Direct Current; "DC"). Although, a transmit/receive module typically consumes more electrical energy during transmission of electromagnetic pulses, the centralized power distribution system must manage and down convert stored electrical energy for operation of the sensitive electronics of such transmit/receive modules during all phases of operation (e.g., transmission, reception and digital conversion).

Power requirements for a radar system increase as more transmit/receive modules are added to the system. For example, a relatively large aperture phased array antenna radar system may require considerable amounts of power to function. Typical centralized power distribution systems for such phased array antennas collect energy through the solar panels which is subsequently transferred to a centralized voltage regulator and associated power conditioner. The voltage regulator and power conditioner provide power to a plurality of relatively large capacity batteries (e.g., 60 to 200 Amp-hour batteries) to charge the batteries. These batteries thereby supply power to a payload (e.g., a radar system) through a power distribution unit, typically at 28 volts. Power is subsequently distributed from the batteries to transmit/receive modules of the radar system via 28 volt-DC power lines and also to an antenna via a high-voltage bus to reduce power losses.

When distributing the power, a typical centralized power distribution system boosts voltage of a power signal supplied to reduce transmission loss. Boosting the power to higher voltages (e.g., 96 volt-DC or higher) typically requires an assembly of costly, complex, and heavy circuits. For example, a power boost regulator that boosts voltage from 28 volts-DC to 100 volts-DC may weigh over 190 kg. The main bus filter used in filtering ripple to the transmit/receive modules may also be relatively heavy (e.g., weighing over 23 kg), as well as having a relatively large volume (e.g., about 43 cm×31 cm×23 cm).

Additionally, power losses are inherent to the cumulative inefficiencies associated with power transfer from solar collection to distribution to the transmit/receive modules. For example, when power is subsequently delivered to a transmit/receive module, the power is converted through the use of a voltage de-boost circuit. Voltages at the transmit/receive modules may "droop" to significantly lower levels through such a voltage de-boost circuit. A droop as used herein generally refers to a change from a higher voltage to a lower voltage but not necessarily confined to an undervoltage condition. Accordingly, when multiple transmit/receive modules are employed, larger power management burdens are placed upon the centralized power distribution system. These management burdens often result in complex, expensive, and relatively heavy equipment.

Phased array radar antennas may employ hundreds of thousands of transmit/receive modules. For example, the number of transmit/receive modules associated with a SAR corresponds to resolution; more transmit/receive modules typically means better SAR image resolution. It is common for large phased array radars to draw in excess of 20 kilowatts DC peak power (i.e., high voltage and/or high current). Each transmit/receive module, however, draws a significantly smaller portion of the total power as such transmit/receive modules operate at low voltages of about 3.5 volts-DC. Since power must be distributed in high voltage (e.g., between about 96 volts-DC and 120 volts-DC) to reduce transmission loss, voltages delivered to each transmit/receive module must be down converted to the 3.5 volts-DC of the transmit/receive modules.

Such down conversion results in complex equipment because scaling from substantially high voltages to relatively small voltages is not easily done. For example, power distribution to the individual transmit/receive modules typically must be well behaved and regulated within ±5% of nominal (e.g., 6 volts-DC or 0.05×120 volts-DC). To achieve ±1% regulation at the transmit/receive modules, additional filtering is required during the voltage conversion from high voltage. Such is provided by DC-DC converters, which also supply negative reference voltage for the transmit/receive modules but add to the complexity of the system. Power distribution is further complicated because transmission lines from a centralized power distribution system must be strung throughout the entire array to transfer power to each transmit/receive module. For example, transmission lines must be tediously connected to each of the transmit/receive modules which may number in the hundreds of thousands. The transmission lines also add to the overall mass and size of the space vehicle.

SUMMARY OF THE INVENTION

Accordingly, the present invention is directed to supplying power to the transmit/receive modules, generally referred to herein as radio frequency modules, of SAR systems or the like using dedicated power supply units. Each power supply unit is generally associated with a particular radio frequency module of the radar antenna. The present invention is advantageous for a number of reasons including permitting the centralized power distribution system of a radar satellite to be substantially simplified or eliminated altogether. In this regard, a space vehicle may be configured of relatively lighter and/or smaller components, a typical goal in space vehicle manufacturing processes. This and other advantages are achieved in accordance with a number of aspects of the present invention, examples of which are listed hereinbelow.

A first aspect of the invention is generally directed to a system that supplies power to a radio frequency module of a radar antenna. The system comprises a dedicated power cell that supplies a power signal and includes a dedicated solar power module that generates electrical energy for the power signal. The system also comprises a dedicated signal conditioner coupled to the power cell and to the radio frequency module. The signal conditioner conditions the power signal for use by the radio frequency module. The radio frequency module receives conditioned power from the signal conditioner to use in processing a radio frequency signal (e.g., transmitting and/or receiving a radar signal).

In this regard, the radio frequency module may comprise one or more radiating elements that transmit pulsed electromagnetic energy for use in radar processing. The radio frequency module may also comprise a receiver that receives the pulsed electromagnetic energy reflected from a target. In one embodiment, the receiver is a Synthetic Aperture Radar receiver.

The power cell may comprise a dedicated battery that supplies the power signal. The battery may be coupled to the signal conditioner and, in one embodiment, the battery is a lithium electrochemical battery (e.g., multiple cells) or single cell, such as a lithium ion battery or lithium ion cell. As used herein, battery generally refers to either a single cell or multiple cells. The power cell may also comprise a dedicated battery charger coupled to the solar power module and to the battery to charge the battery with electrical energy generated by the solar power module. In this regard, the battery charger may comprise a processor that controls charging of the battery by providing the battery a substantially constant level of electrical energy from the solar power module and by terminating charging of the battery upon detection of an over-voltage condition or an over-temperature condition at the battery. The processor may also decouple the battery from the signal conditioner upon detection of an under-voltage conditioned at the battery.

The signal conditioner may comprise a dedicated voltage regulator that regulates a voltage of the power signal. The signal conditioner may further comprise a dedicated capacitor bank coupled to the voltage regulator to temporarily store the power signal. The temporary storage of the power signal by the capacitor bank may deter voltage droop resulting from transmission of pulsed electromagnetic energy by the radio frequency module. The signal conditioner may further comprise a dedicated voltage converter coupled to the voltage regulator and to the radio frequency module. The voltage converter may receive the power signal and generate a negative voltage power signal therefrom for supply to the radio frequency module.

A second aspect of the invention is generally directed to a method of supplying power to a radar antenna. The method comprises the steps of associating a solar power module with a radio frequency module of the radar antenna and receiving solar energy with the solar power module to generate electrical energy for a power signal. The method also comprises the steps of controlling the power signal to charge a battery, using the battery to supply the power signal to the associated radio frequency module, and consuming the power signal with the associated radio frequency module to process a radar signal (e.g., transmit and/or receive the radar signal). In one embodiment, the radar signal comprises a plurality of Synthetic Aperture Radar pulses. The method may also comprise a step of associating additional solar power modules with additional radio frequency modules of the radar antenna.

The method may further comprise a step of conditioning the power signal to maintain a substantially constant voltage for the associated radio frequency module. For example, the step of conditioning the power signal may comprise temporarily storing at least a portion of the power signal to deter voltage droop with the associated radio frequency module. Additionally, the step of conditioning the power signal may comprise converting at least a portion of the power signal to a negative voltage power signal for supply to the associated radio frequency module.

The step of controlling the power signal may comprise maintaining a substantially constant current to the battery and terminating the substantially constant current to the battery upon detection of an over-voltage condition or an over-temperature condition at the battery. The step of controlling the power signal may further comprise decoupling the battery from the signal conditioner upon detection of an under-voltage condition at the battery. In one embodiment, the battery is a lithium electrochemical battery, such as a lithium-ion battery.

DETAILED DESCRIPTION OF THE DRAWINGS

Figure 1:
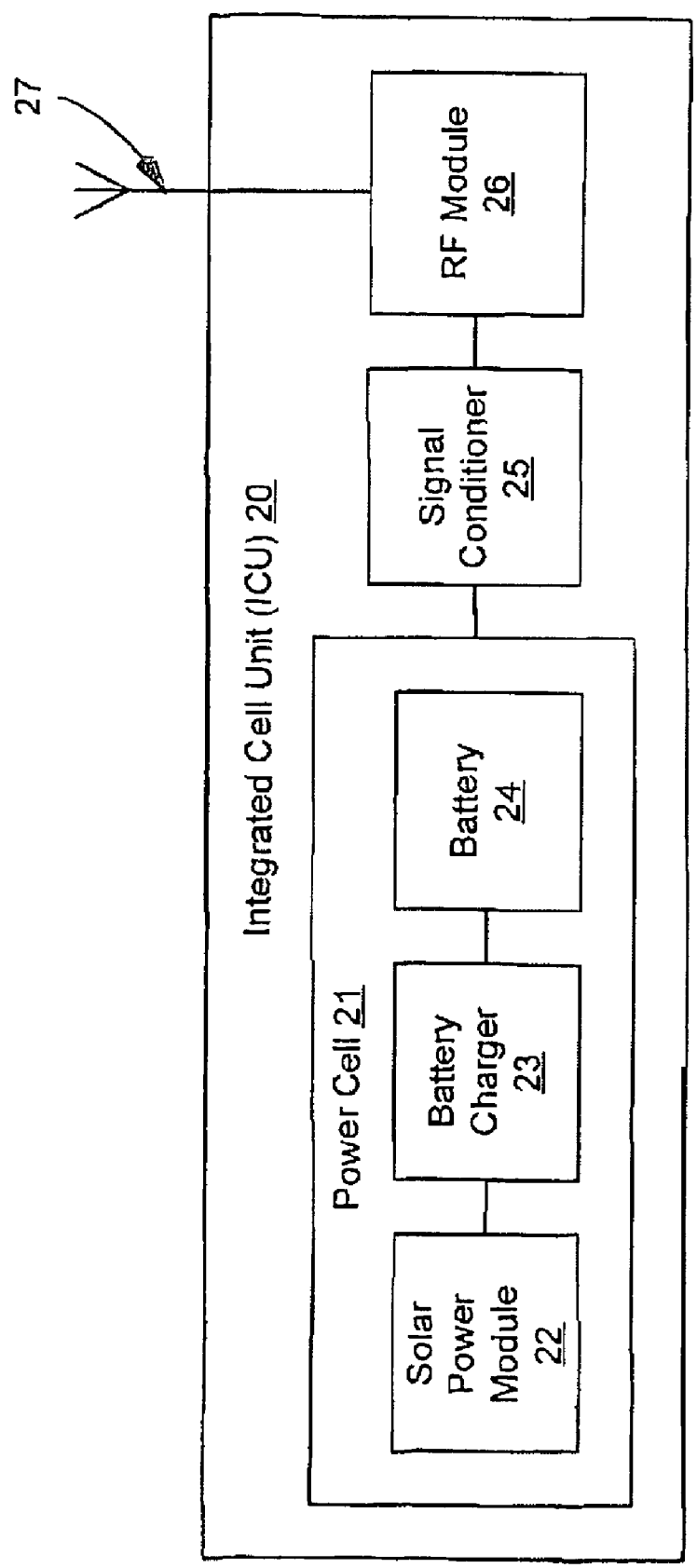
FIG. 1 is a block diagram of an integrated cell unit ("ICU"), in one exemplary embodiment of the invention.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

FIG. 1 is a block diagram of ICU 20. In this embodiment, ICU 20 includes at least three sections (i.e., power cell 21, signal conditioner 25, and RF module 26) that are used to process a radio frequency signal. For example, ICU 20 may generate and condition a dedicated electrical power signal for use by RF module 26 in transmitting and receiving-pulsed electromagnetic energy via antenna 27. Antenna 27 as shown herein may be representative of multiple radar antennas (e.g., one antenna for transmitting pulsed electromagnetic energy and another antenna for receiving the pulsed electromagnetic energy as reflected by a target of interest).

In one embodiment, ICU 20 is configured aboard a space vehicle and is one of a plurality of ICUs configured with the space vehicle. For example, RF module 26 may be a radar transmitter and receiver associated with a SAR. A SAR typically employs a plurality of transmitters and receivers to generate a SAR image. The transmitters "illuminate" a scene of interest with electromagnetic pulses. A SAR receive antenna receives reflected pulses for conversion from analog electromagnetic pulses to digital SAR data for subsequent SAR image processing. As such, a SAR receiver may be configured with an analog to digital converter that digitally converts received electromagnetic pulses to digital SAR data. This digital SAR data may then be processed to generate a SAR image.

A SAR receive antenna is typically smaller than a conventional radar antenna because image resolution effects of conventional radar antennas can be synthesized using SAR imaging techniques. For example, the length of a conventional radar antenna typically determines the resolution in the azimuth direction of the image (i.e., along the radar's flight track). A longer antenna results in a finer resolution in this dimension. A SAR synthesizes this effect by receiving backscattered pulses as it moves in an azimuth direction with respect to the scene of interest.

Because the SAR moves relative to the scene of interest, the backscattered pulses shift in frequency due to Doppler effects. Comparing the Doppler shifted frequencies of the electromagnetic pulses to a reference frequency allows the backscattered pulses to be "focused" on a particular point in the scene of interest. This "Doppler focusing" synthetically increases the length of the antenna that is imaging that particular point thereby forming a "phase aperture".

SAR image resolution may be improved by employing a plurality of transmit/receive modules (e.g. RF module 26) because, among other reasons, more modules generate more data to process. Each of these modules, and other radar modules as well, requires electrical energy (e.g., electrical energy having a voltage between about 3 and 4 volts-DC) to control the transmission and reception of electromagnetic pulses. ICU 20 integrates electrical energy supply components (i.e., power cell 21 and signal conditioner 25) with RF module 26 to provide a transmit/receive module that substantially eliminates the need for costly, complex, and/or heavy power management equipment. As such, a plurality of ICUs may be independently configured with respect to power management aboard a space vehicle. Such an embodiment is exemplarily shown and described hereinbelow in FIG. 2.

In this embodiment, power cell 21 is coupled to signal conditioner 25 to supply the power signal thereto. Power cell 21 includes a solar power module 22 that generates electrical energy for the power signal. For example, solar power module 22 may include a solar cell that receives and converts solar energy to electrical energy. Power cell 21 may include battery 24 and battery charger 23 to assist in supplying the electrical energy to RF module 26 via signal conditioner 25. For example, battery charger 23 may receive converted electrical energy from solar power module 22 to charge battery 24 with DC. Battery 24 may be a lithium-ion battery requiring protection from under voltage conditions (e.g., about 2.8 volts-DC) and overvoltage conditions (e.g., between about 3.8 and 4 volts-DC), which may damage and/or diminish the life of the battery. Those skilled in the art should readily recognize that other batteries, however, may be used. For example, other types of electrochemical batteries, such as Nickel Cadmium batteries or other lithium type batteries may be used.

Additionally, battery charger 24 may include a Single Ended Primary Inductance Converter ("SEPIC") topology. SEPIC topology, as is known to those skilled in the art, allows for an input voltage range to overlap an output voltage range. For example, some lithium-ion batteries retain useful energy between about 4.2V and 2.7V (i.e., output voltage). SEPIC topology allows an input voltage to range above and below this output voltage thereby eliminating exclusive "step-up" or "step-down" configurations (e.g., boost configurations or buck configurations, respectively, as is known to those skilled in the art). SEPIC topology may also be used for adjusting output power voltage such as when battery charger 23 receives lower battery input voltages. For example, when battery charger 23 receives lower voltage power from solar power module 22, battery charger 23 may still provide the requisite output voltage for battery 24.

Once charged by battery charger 23, battery 24 may supply a DC power signal to signal conditioner 25 to condition the power signal for use by radio frequency module 26. For example, signal conditioner 25 may regulate output voltage to RF module 26 to prevent over/under voltage conditions occurring at battery 24. Signal conditioner 25 may also provide ripple filtering of the power signal and/or provide a negative voltage supply for RF module 26. RF module 26 may thereby receive conditioned power from the signal conditioner 25 to use in processing an RF signal (e.g., transmitting and/or receiving electromagnetic energy). Additionally, signal conditioner 25 may provide information relating to the status of the power cell 21 (e.g., to a central processing system of a space vehicle). For example, a general-purpose processor, such as processor 80 of FIG. 7, may be configured to detect certain characteristics relating to health of power cell 21 based on the processing of various signals, such as the electrical power signal, within power cell 21. These characteristics may be transferred to a central processing system of the space vehicle for immediate attention thereto and/or for further consideration by a ground station.

Figure 2:
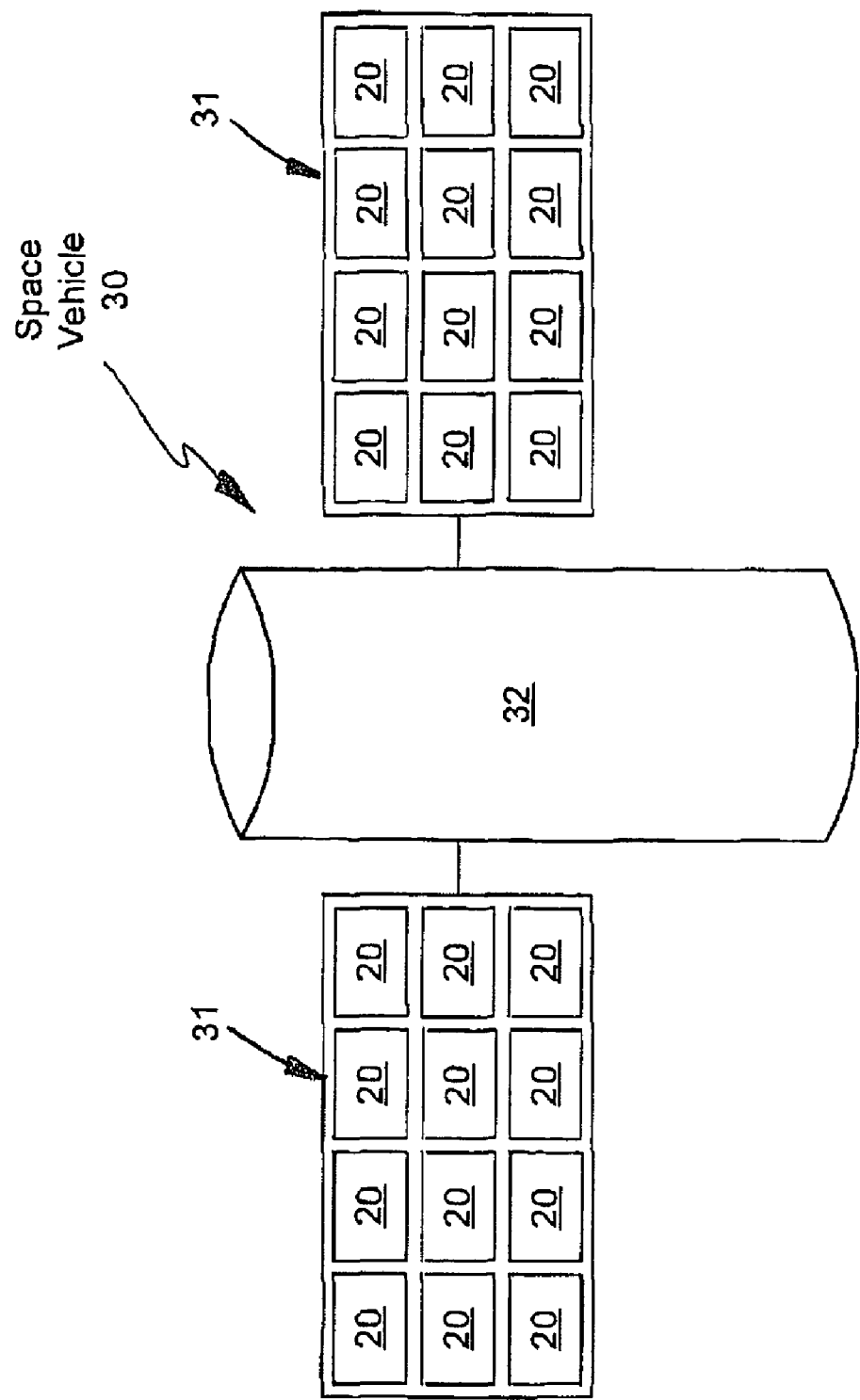
FIG. 2 is an illustration of a space vehicle using a plurality of ICUs, in one exemplary embodiment of the invention.

FIG. 2 is an illustration of a space vehicle 30 using a plurality of ICUs 20. In this embodiment, space vehicle 30 is configured with panels 31 and a body 32. Each panel 31 has an array of ICUs 20 configured therewith. Once panels 31 deploy, each ICU 20 is capable of generating and managing its own power. For example, each ICU 20 has a solar power module 22 that generates electrical energy. Each ICU 20 also has its own battery charging and signal conditioning characteristics (e.g., power cell 21 and signal conditioner 25) to supply conditioned power to RF module 26. Such a configuration is advantageous because, among other reasons, space vehicle 30 does not require the complex and heavy equipment associated with distributing power to transmit/receive modules (e.g., RF module 26 of ICU 20). Such a configuration of ICUs 20 reduces the need for centralized power distribution systems because, among other reasons, electrical energy is generated and consumed independently of other systems within space vehicle 30.

Figure 3:
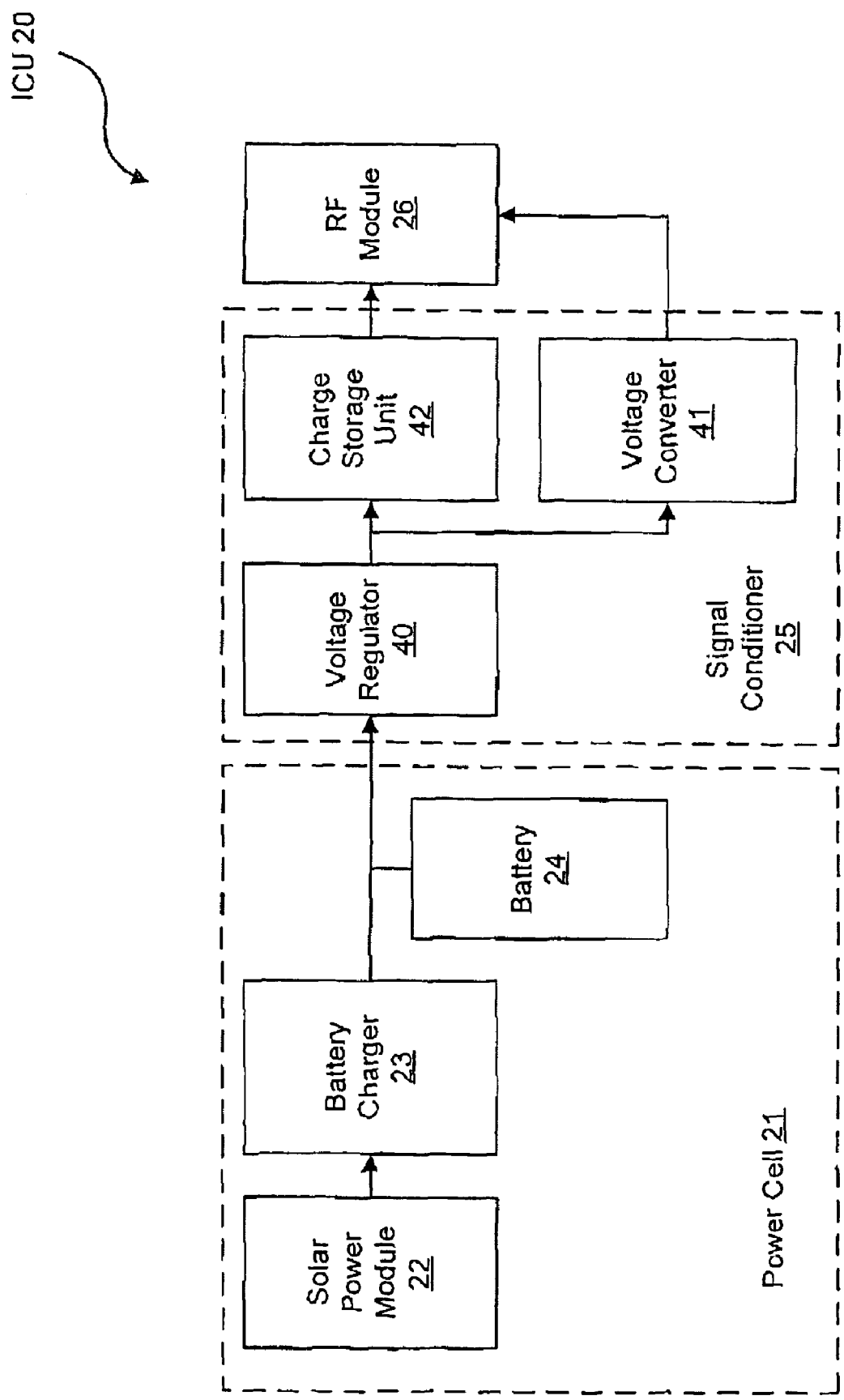
FIG. 3 is another block diagram of an ICU, in one exemplary embodiment of the invention.

FIG. 3 is a detailed block diagram of ICU 20, in one exemplary embodiment. FIG. 3 illustrates an embodiment with detailed connections between components of ICU 20 (i.e., solar power module 22, battery charger 23, battery 24, voltage regulator 40, charge storage unit 42, and voltage converter 41). FIG. 3 also exemplifies the manners of operations of the individual components. For example, battery charger 23 is described with respect to its charge logic and control for managing the state of charge for battery 24, such as a lithium-ion battery; voltage regulator 40 is described with respect to its regulation of the output voltage from battery 24 to RF module 26; charge storage unit 42 is described with respect to its high-speed energy storage and ripple filter abilities for RF module 26; and voltage converter 41 is described with respect to its provision of a negative voltage supply to RF module 26.

Battery Charger 23

In this embodiment, battery charger 23 is coupled to battery 24 to charge the battery 24. Battery charger 23 is also coupled to solar power module 22 and receives electrical energy therefrom (i.e., via conversion of solar energy to electrical energy). Battery charger 23 may charge battery 24 with this electrical energy while protecting it from failure, such as that caused by excessive heat from overcharging. For example, battery charger 23 may prevent charging of battery 24 at an excessive rate and/or an extended time which may cause the battery 24 to overheat and fail. As is known to those skilled in the art, battery failure can result in collateral damage to space vehicle 30 and/or components thereof.

Battery charger 23 may charge battery 24 with a constant current charge. Additionally, battery charger 23 may prohibit trickle charging, as is known to those skilled in the art and as it relates to lithium electrochemical batteries. However, those skilled in the art should readily recognize that other types of batteries may be used and, as such, other types of charging such as trickle charging may be employed. In an embodiment where battery 24 is a lithium-ion battery, battery charger 23 may be configured to protect battery 24 from overcharging that may result in an overvoltage condition (e.g., between about 3.8 and 4.0 volts-DC). Additionally, battery charger 23 may be configured to prevent battery 24 from reaching a state of charge of less than 2.8 volts-DC because permanent damage may result to battery 24 if over discharged. These and other charging modes, of battery charger 23 may be summarized as follows:

A. Charge battery 24 at a constant current rate of about 0.7C (where C is the nameplate rating or capacity of battery 24);

B. Provide the constant current charge until the voltage of battery 24 is a nominal voltage of 3.8 volts-DC at beginning of life ("BOL"; e.g., when battery 24 is prepared to supply power) or 4.1±0.1 volts-DC at end of life ("EOL"; e.g., when battery 24 has discharged beyond use);

C. Provide a constant voltage topping charge, or taper current, to battery 24 and terminate such charging when the topping current drops to a value of C/50;

D. Disconnect battery 24 from the radar load (i.e., RF module 26) in the event that an under voltage condition is detected (e.g., about 2.8 volts-DC); and E. Terminate battery 24 from charging in the event that an over-voltage or over temperature condition is detected to protect battery 24 from failure.

Battery charger 23 may also regulate the output voltage of solar power module 22. For example, output voltage from solar power module 22 may vary above and/or below voltage requirements of battery 24. Battery charger 23 may therefore control the output voltage of solar power module 22 to control the charge to battery 24 (e.g., when charging of battery 24 is being performed during charging mode "B"). Additionally, it may be desirable for RF module 26 to draw electric current directly from solar power module 22 to reduce discharging of battery 24 and thereby extend the life of the battery. Accordingly, battery charger 23 may be configured to provide electric charge current in either voltage situation (i.e., directly from solar power module 22 to voltage regulator 40 or from solar power module 22 to charge battery 24). A circuit topology that may provide this capability is a SEPIC topology. For example, battery charger 23 may include one or more inductors (illustrated below in FIG. 4) to accommodate such variable input voltages by operating as a DC-DC converter to charge battery 24. This DC-DC conversion provides voltage regulation when either conducting current directly from solar power module 22 to signal conditioner 25 or from battery 24 to signal conditioner 25.

Battery charger 23 may be configured in such a way as to ensure that battery 24 discharges a power signal to voltage regulator 40 of signal conditioner 25. For example, battery charger 23 may include circuitry which deters current flow from battery 24 to battery charger 23. In one embodiment, battery charger 23 is configured as an integrated circuit capable of implementing SEPIC topology. For example, a SEPIC topology may be implemented with an Application Specific Integrated Circuit ("ASIC") or a hybrid of analog and digital circuitry.

Voltage Regulator 40

Signal conditioner 25 receives the power signal from battery 24 to condition the power signal prior to use by RF module 26. In this regard, signal conditioner 25 may receive the power signal via voltage regulator 40 in order to regulate the output voltage of battery 24. For example, a lithium-ion battery output range is between about 3 and 4 volts-DC. In order to use all of the electrical energy stored with the lithium-ion battery, voltage regulator 40 provides a regulated output voltage regardless of whether the input voltage is above or below the target voltage. Therefore, the voltage regulator is also configured with SEPIC topology to provide 3.5 volts-DC voltage regulation regardless of where the input voltage is in a range between about 3 and 4 volts-DC (e.g., typical voltage regulation is about 0.1 volts-DC for an operating voltage of 3.5 volts-DC). Additionally, voltage regulator 40 may be used to prevent an under voltage condition at the output of battery 24.

In one embodiment, an integrated circuit (e.g., an ASIC or a hybrid of analog and digital circuitry) capable of providing the required amount of load current is used to reduce circuit area. Depending on the configuration of RF module 26 and its requisite power, the current switch capability is in the range of 6 amps.

Voltage Converter 41

Signal conditioner 25 may include voltage converter 41 to provide a negative voltage power signal. For example, electronics, such as RF module 26, often require both positive and negative voltages during operation for various operational aspects. Voltage converter 41 may provide a power signal having a negative voltage for use as a reference signal for RF module 26 during operations. The negative voltage power signal is about −3.5 volts-DC. In generating the negative voltage power signal, voltage converter 41 may provide a voltage inversion of the power signal output by voltage regulator 40. For example, voltage converter 41 may provide a power signal having an output voltage that is equal in magnitude to its input voltage. In one embodiment, a switched-capacitor voltage converter circuit topology may be used to reduce size of ICU 20.

Charge Storage Unit 42

As previously mentioned, a radar operates by transmitting pulses of electromagnetic energy and receiving reflections thereof. Depending on the radar application, the electromagnetic energy pulses may be between about 100 and 400 microseconds in duration and pulsed at a rate between about 500 Hz and 22 kHz, generally referred to as a Pulse Repetition Frequency ("PRF"). Bursts of electrical energy from a power supply are required by RF module 26 for each pulse. Generally, power supplies cannot instantly respond to high energy demands of RF module 26 when generating such pulses. Consequently, the output voltage may droop and degrade signal integrity. Charge storage unit 42 provides a relatively fast response energy storage so as to accommodate the demands of RF module 26.

The capacitance needed by charge storage unit 42 may depend on the power drive requirements of ICU 20, the pulse width (e.g., in microseconds) and voltage droop allowance. The voltage droop requirement for RF module 26 may be less than about 100 millivolts. The total capacitance value required is therefore based on the equation $$C = \frac{I}{dv/dt}$$

where C is capacitance, I is the current and dv/dt is the differential voltage per time. To meet the demands of current and voltage of ICU 20, for which current is typically between about 2 and 6 Amps with pulse width ranges between about 100 and 400 microseconds, the capacitance is about 8800 microfarad per ICU (e.g., ICU 20).

Figure 4:
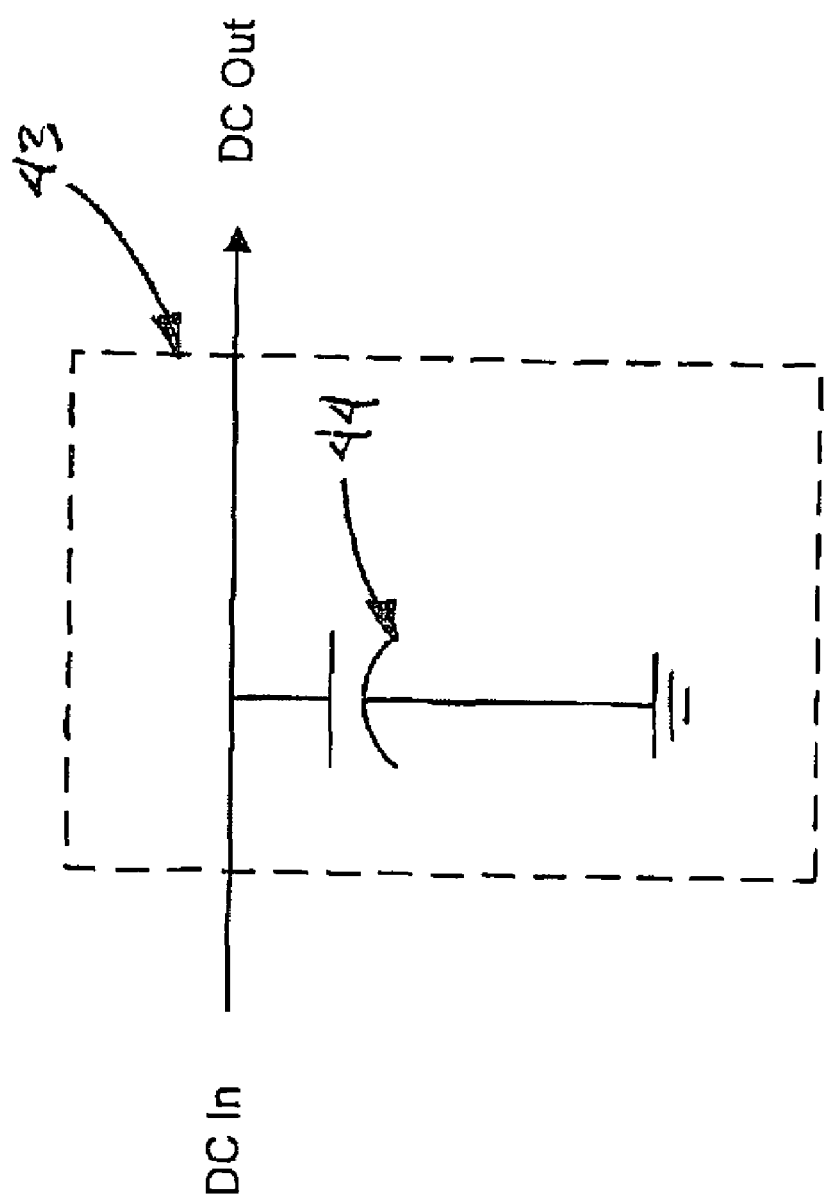
FIG. 4 is a circuit diagram of a charge storage unit used in an ICU, in one exemplary embodiment of the invention.

In one embodiment, the electrical energy is provided by a capacitor bank with low equivalent series resistance ("ESR"), capable of high frequency operation. For example, the capacitor bank may be an array of capacitors connected in parallel. In one embodiment, twenty five of these capacitors are connected in parallel to provide storage and ripple filtering for RF module 26. This configuration may achieve an appropriate level of capacitance for required energy storage. An example of a capacitive element (i.e., element 43 including capacitor 44) that may be used in such a capacitor bank is shown in FIG. 4.

The amount of capacitance used for charge storage unit 42 may depend on power requirements of RF module 26. For example, the amount of capacitance required by charge storage unit 42 may take into consideration pulse width of electromagnetic energy pulses transmitted by RF module 26 and voltage droop allowed by the RF module 26. In one embodiment, the voltage droop allowance of RF module 26 is less than about 100 millivolts.

Integrated circuit capacitors may be selected to meet these needs because of their high frequency response time, large surge current capability, and very high packaging densities. Due to the low voltage (i.e., about 3.5 volts-DC), the capacitors do not require series connections (i.e., "stacking") to increase the voltage rating. Such integrated circuit capacitors may be as small as 7.2 mm×4.3 mm×4.0 mm. As such, systems employing such capacitors enjoy certain minimization advantages.

The nature of space based radar (e.g., SAR) generally requires electromagnetic pulse transmissions with pulse durations ranging between about 100 microseconds and 400 microseconds. The PRF may range between about 500 Hz and 22 kHz. Power systems are designed for worst-case scenarios because, once deployed, reconfiguration is unlikely. These worst-case scenarios typically include pulse widths of about 400 microseconds and PRFs of about 20 kHz. Depending on the number of transmit/receive modules, electric current to the modules may be on the order of about 20 kW distributed at 120 volts-DC, or 170 amps. The capacitance required to provide high speed energy storage and filtering in this scenario is about 8,500 microfarads (i.e., based on the equation $$C = \frac{I}{dv/dt},$$

where I=170 amps and dv/dt is about 6/0.0003).

Figure 5:
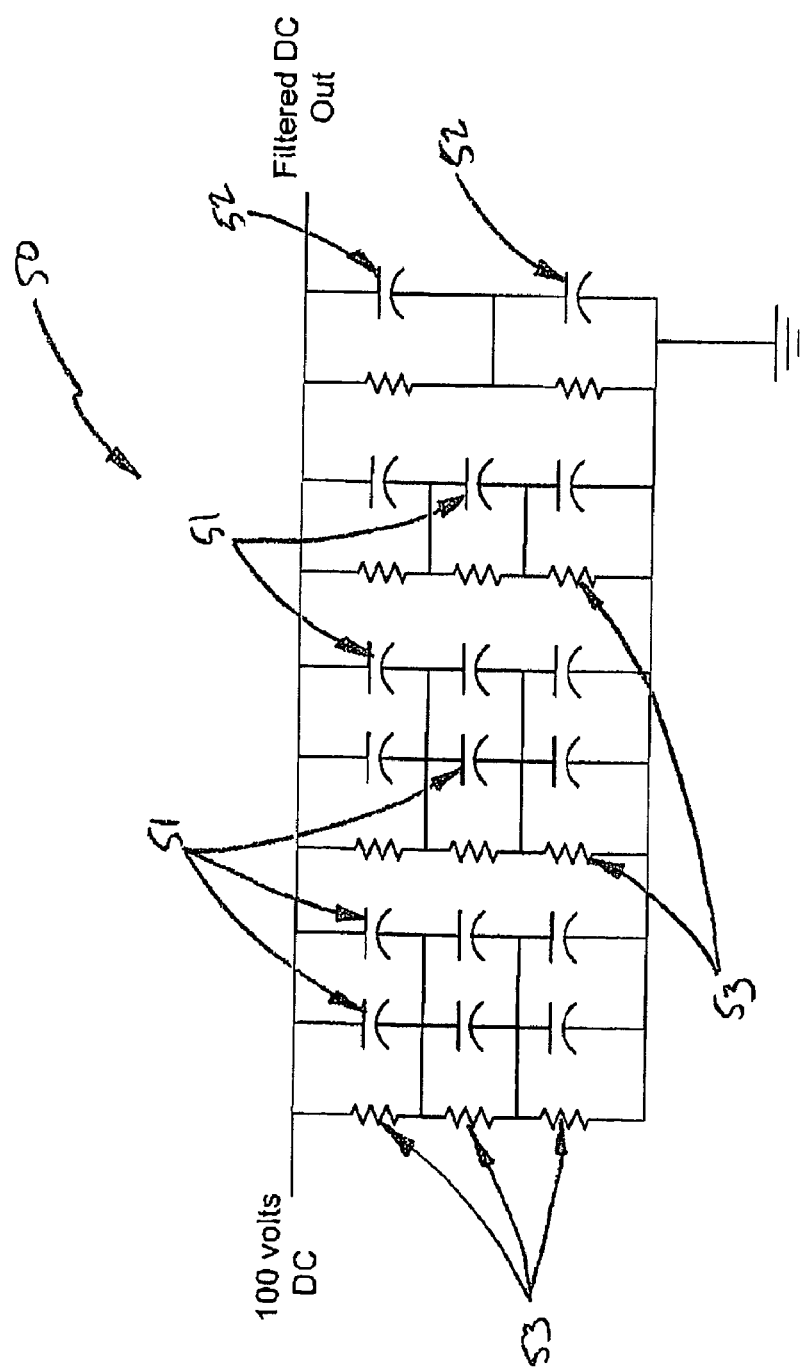
FIG. 5 is circuit diagram of a prior art charge storage unit.

FIG. 5 is provided herein to illustrate the differences between charge storage unit 42 and prior charge storage units. FIG. 5 shows a circuit diagram of one prior art charge storage unit in a charge storage unit/ripple filter 50. Charge storage unit/ripple filter 50 stores and filters electrical energy and for use by transmit/receive modules of a phased array radar (e.g., a SAR). Charge storage unit/ripple filter 50 is typically configured to include fifteen tantalum capacitors 51 having values of about 120 microfarads, two multiple layer ceramic capacitors 52 having high frequency capabilities for ripple filtering, and eleven resistors 53. Ceramic capacitors 52 have a total capacitance of about 220 microfarads. Charge storage unit/ripple filter 50 is configured with each transmission line to provide electrical energy and ripple filtering for each transmit/receive module.

Again, the nature of space based radar (e.g., SAR) generally requires worst-case scenario electromagnetic pulse transmissions having pulse durations of about 400 microseconds and PRFs of about 20 kHz. The capacitance required to provide high speed energy storage and filtering in this scenario is about 8,500 microfarads again based on the equation $$C = \frac{I}{dv/dt},$$

where I=170 amps and dv/dt is about 6/0.0003.

To accommodate the 8,500 microfarads requirement, charge storage unit/ripple filter 50 is typically designed and fabricated having capacitors capable of high voltage operation generally resulting in larger storage unit/ripple filters. Capacitors may be rated at about 150 volts-DC are required for a 100 volts-DC bus. High reliability space qualified capacitors with high voltage ratings typically have low capacitance values and large package size. Additionally, as many as forty charge storage units/ripple filters 50 may be used to provide the 8,500 micro-farads filter with each distributed power transmission which further increases size.

Capacitors 51 also need to accommodate large surge currents while having low series resistance. In high voltage systems, such capacitors are connected in series, or stacked, to increase their voltage rating, which also reduces their capacitance capability. Stacked capacitors generally require a "charge equalize/discharge" resistor to ensure voltage distribution and safety. Capacitors 51 also generally require high frequency capabilities due to the high frequency operation of the transmit/receive modules (e.g., relatively short pulse widths). Capacitors with characteristics that meet such requirements are typically a combination of tantalum and multilayer ceramic type.

Charge storage unit/ripple filter 50 differs from charge storage unit 42 of FIG. 4 because, among other reasons, capacitors of charge storage unit 42 are reduced in size to integrated circuit levels thereby decreasing size and weight of space vehicle components. Accordingly, charge storage unit 42 represents an improvement over the prior art charge storage unit/ripple filter 50.

Figure 6:
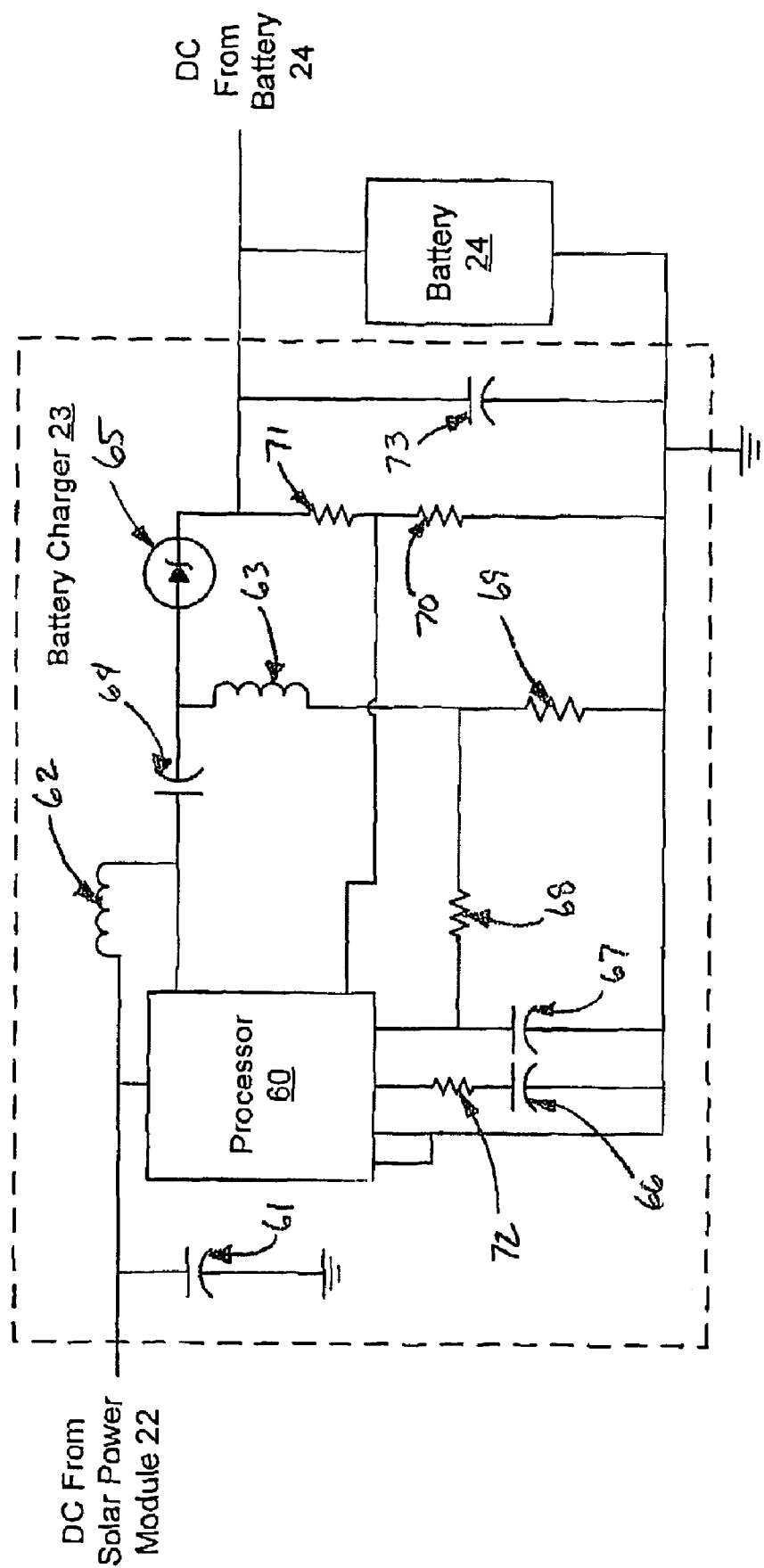
FIG. 6 is a circuit diagram of the battery charger and battery used in an ICU, in one exemplary embodiment of the invention.

FIG. 6 is an exemplary circuit diagram of battery charger 23 and battery 24 used in ICU 20. In this embodiment, battery 24 is a lithium electrochemical battery having a useful energy between about 4.2V and 2.7V. Battery charger 23 may be configured with a SEPIC topology that allows for an input voltage range to overlap an output voltage range as described hereinabove. For example, the SEPIC topology of battery charger 23 includes at least two inductors 62 and 63 (e.g., a transformer having two windings on a common core) and processor 60 that allows an input voltage from solar power module 22 to range above and below this output voltage thereby eliminating exclusive buck or boost configurations.

Additionally, processor 60 may control coupling of battery charger 23 to battery 24. For example, processor 60 may be directed via software instructions to the couple battery charger 23 from battery 24 when certain conditions exist. Examples of such conditions may include overvoltage, undervoltage, and/or overtemperature at battery 24. Moreover, processor 60 may be configured to provide status of battery 24 to other processing elements, such as other processors configured with space vehicle 30. For example, processor 60 may detect certain health characteristics based on the manner in which battery charger 23 charges battery 24. These health characteristics of battery 24 may be transferred to other processors configured with space vehicle 30 to evaluate the effectiveness of a particular ICU 20 with which battery charger 23 and battery 24 are configured.

Other components configured with battery charger 23 include capacitors 64, 61, 66, 67, and 73 and resistors 68, 69, 70, 71 and 72. Capacitor 61 may operate as a filter that low pass filters the input to battery charger 23. Capacitor 73 may low pass filter the input to battery 24. Diode 65, also included with battery charger 23, may operate to prevent current flow into the SEPIC topology.

While one circuit diagram of battery charger 23 has been illustrated, those skilled in the art should readily recognize that the invention is not intended to be limited to the exemplary embodiment shown and described herein. For example, those skilled in the art may choose other implementations for charging a lithium electrochemical battery such as exclusively buck configurations, exclusively boost configurations, or other SEPIC topologies.

Figure 7:
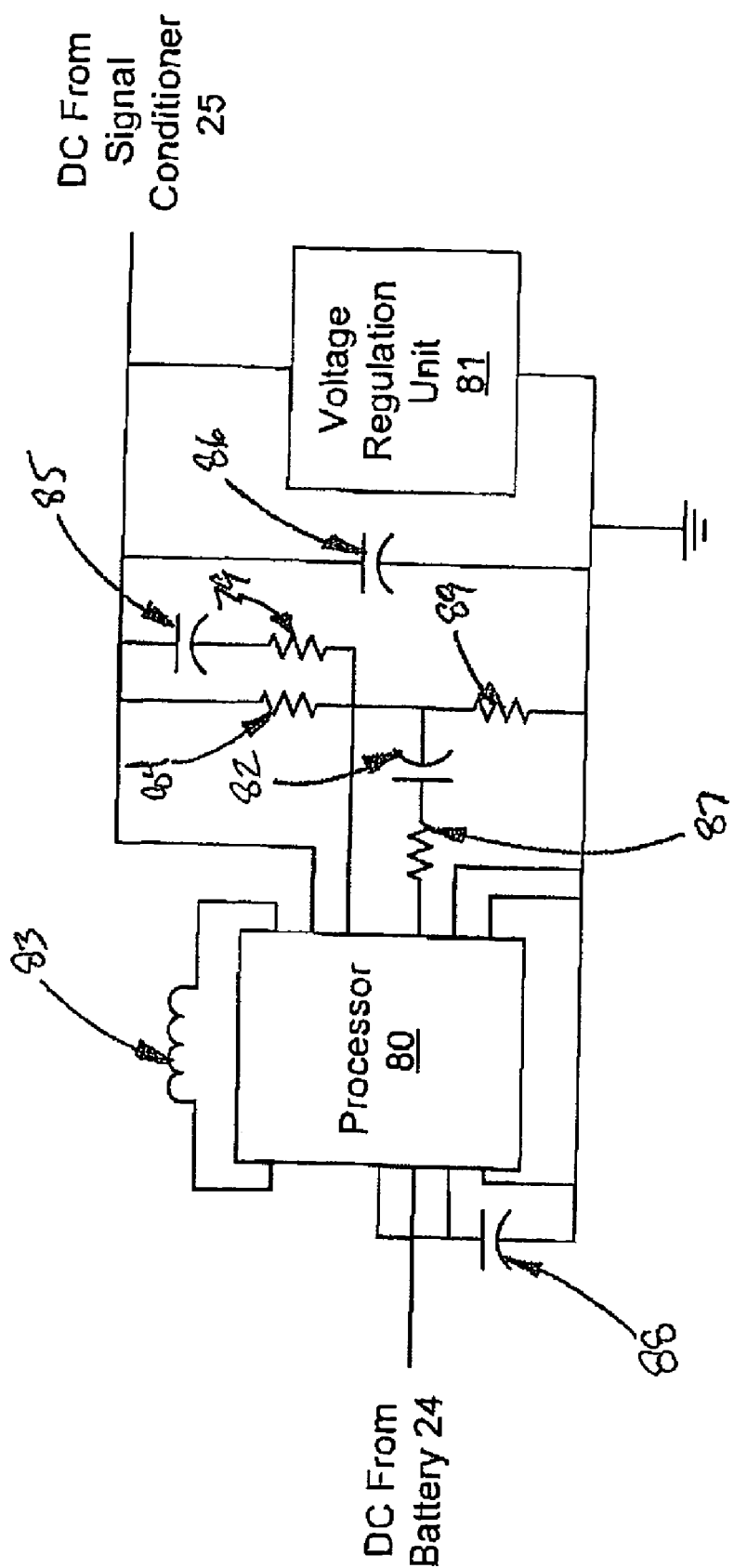
FIG. 7 is a circuit diagram of the voltage regulator used in an ICU, in one exemplary embodiment of the invention.

FIG. 7 is an exemplary circuit diagram of voltage regulator 40 used in ICU 20. In this embodiment, voltage regulator 40 is configured with a SEPIC topology that includes processor 80 and inductor 83. Voltage regulator 40 may also include other components including resistors 79, 84, 87 and 89 and capacitors 82, 85, 86 and 88. Processor 80 may be configured to provide health and status of the power signal. For example, processor 80 may be a general-purpose processor operable via software instructions to detect certain characteristics of the power signal. These characteristics may then be transferred to a central processing system of a space vehicle for immediate attention thereto and/or for further consideration by a ground station.

In this embodiment, voltage regulator 40 is configured as voltage regulation unit 81 which regulates voltage from battery 24. Voltage regulation unit 81 may be configured in a variety of manners that are subject to design choice so as to regulate voltage from a battery, such as battery 24, to a load, such as RF module 26. Together, voltage regulation unit 81 and voltage regulator 40 receive a power signal from battery 24 for conditioning prior to use by RF module 26. For example, voltage regulator 40 provides a regulated a positive power signal to RF Module 26. The positive power signal is regulated by voltage regulation unit 81. Although discussed with respect to voltage conversion prior to voltage regulation, those skilled in the art should readily recognize that voltage conversion may be performed in other ways, such as being performed prior to voltage conversion. One example of where voltage regulation may be performed prior to voltage conversion is shown and described in FIG. 3.

While one circuit diagram of voltage regulator 40 has been illustrated, those skilled in the art should readily recognize that the invention is not intended to be limited to the exemplary embodiment shown and described herein. For example, those skilled in the art may choose other implementations for regulating and/or providing negative power sources. In some instances, voltage regulation may be achieved based on a comparison of an output voltage to a reference voltage without the need for SEPIC topology.

Figure 8:
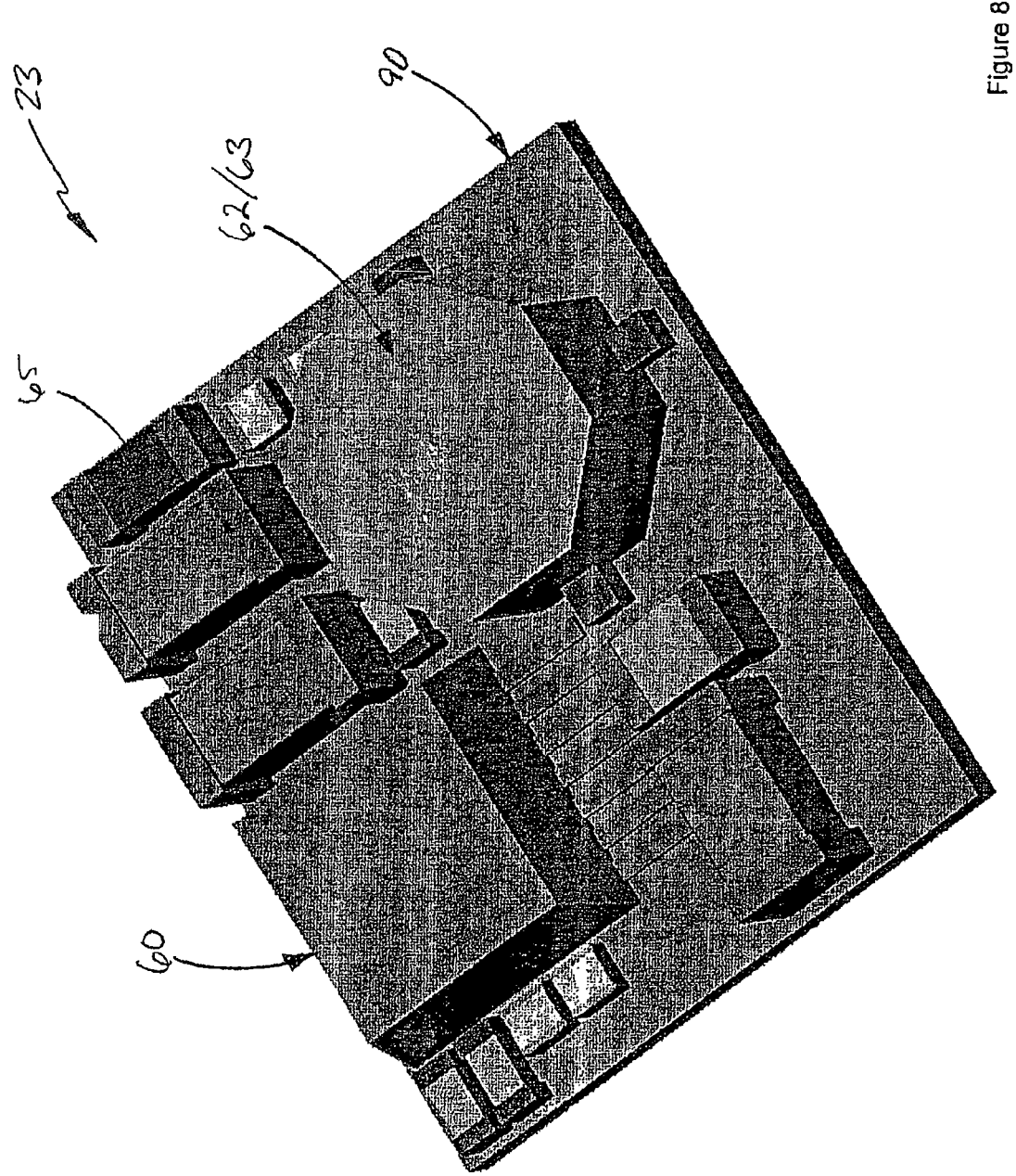
FIG. 8 is an isometric view of a battery charger configured with a circuit board, in one exemplary embodiment of the invention.
Figure 9:
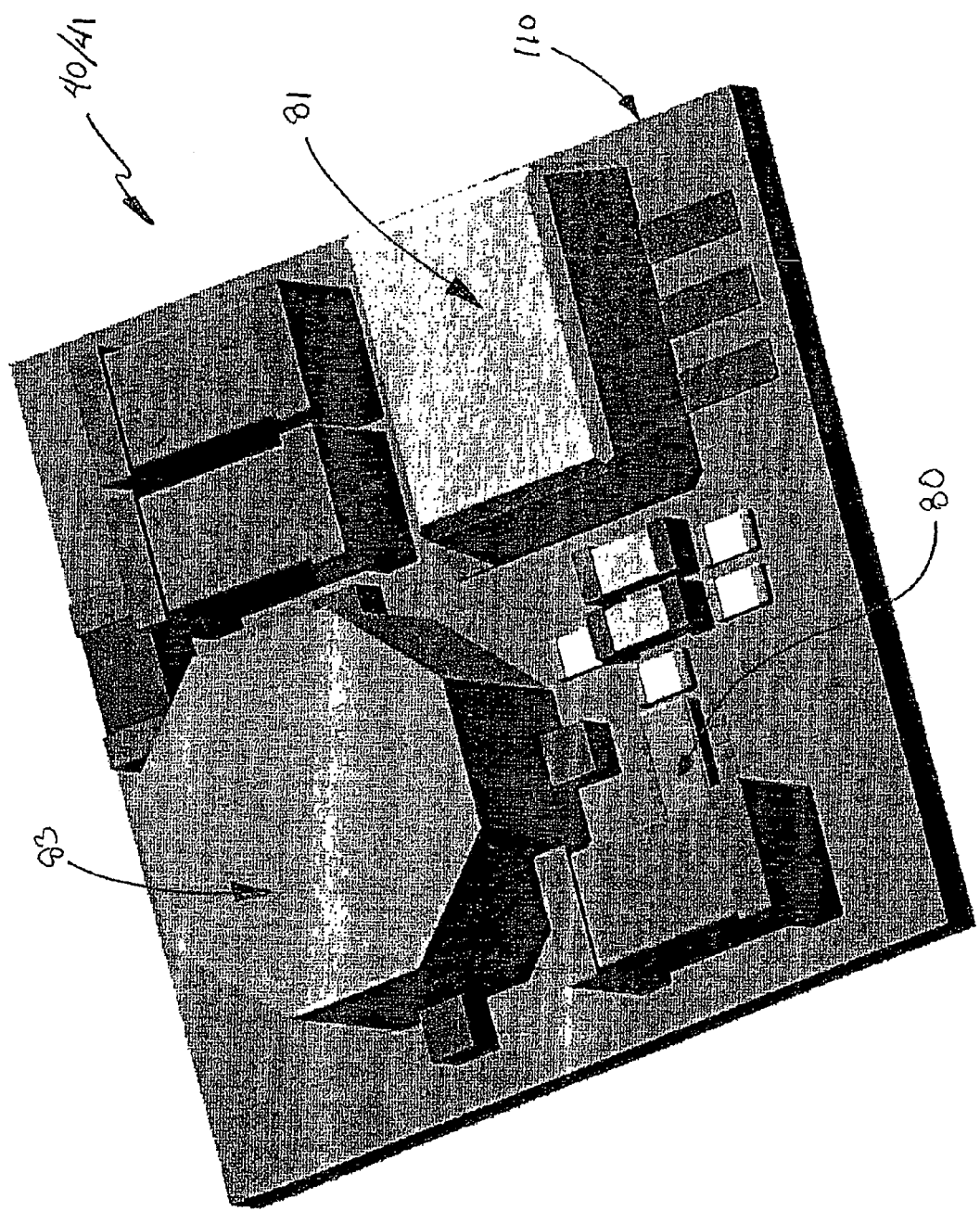
FIG. 9 is an isometric view of a voltage regulator and a voltage converter configured with a circuit board, in one exemplary embodiment of the invention.
Figure 10:
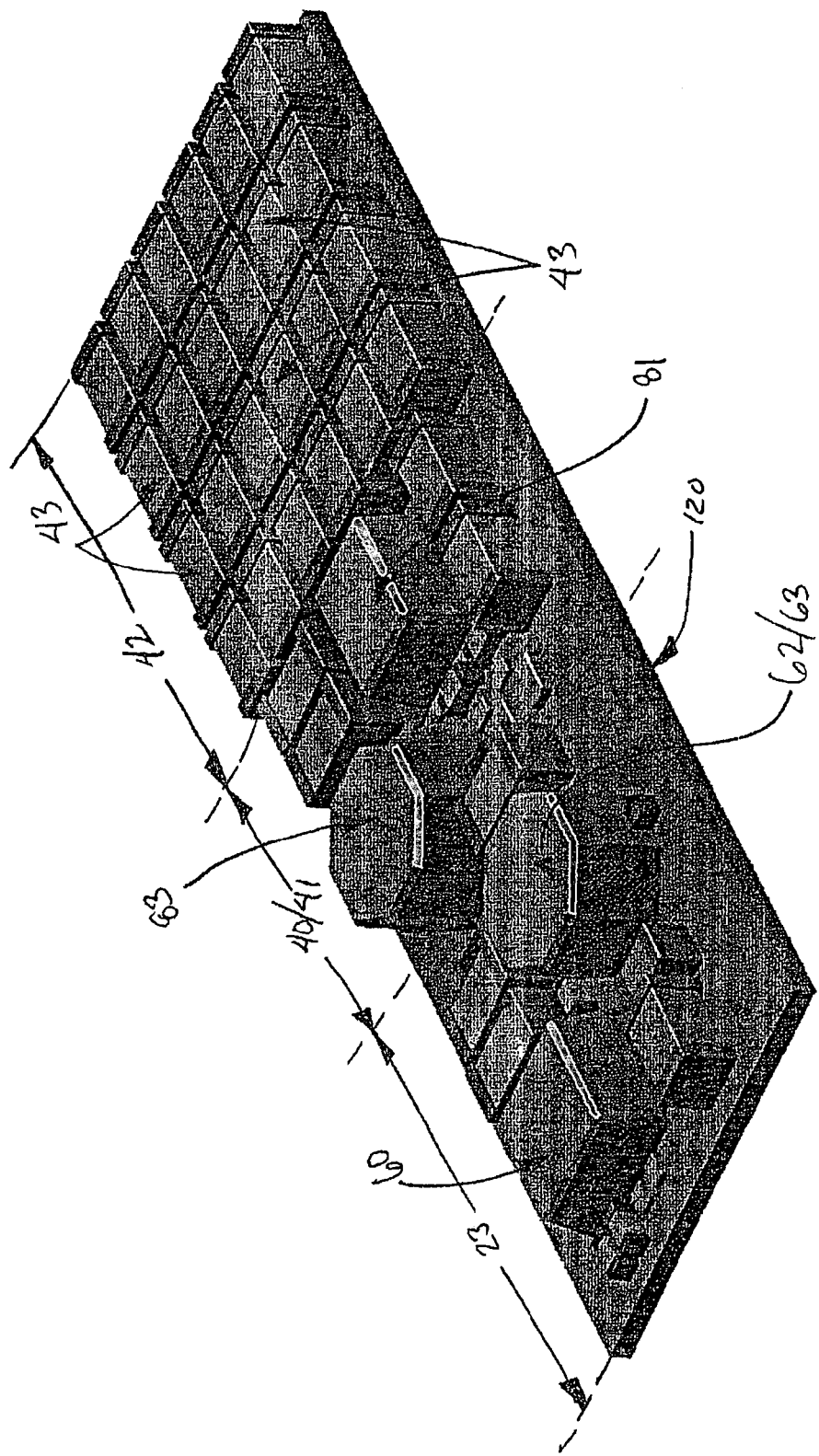
FIG. 10 is an isometric view of an ICU configured with a circuit board, in one exemplary embodiment of the invention.

FIGS. 8 through 10 illustrate isometric views of circuit board configurations for various components of ICU 20. For example, FIG. 8 is an isometric view of circuit board 90 comprising battery charger 23, FIG. 9 is an isometric view of circuit board 110 comprising voltage regulator 40 and voltage converter 41, and FIG. 10 is an isometric view of circuit board 120 of ICU 20 (e.g., circuit board 90 for battery charging, circuit board 110 for voltage regulation and conversion, and a plurality of capacitive elements 43 for storage and ripple filtering). Each circuit board illustrates placement of components used to implement ICU 20. Each of FIGS. 8 through 10, however, are only exemplary configurations which have been shown to reduce size of ICU 20. Those skilled in the art should readily recognize that other circuit board configurations may also be suitable to implement ICU 20.

Advantages of ICU 20 and the components thereof include co-location with a transmit/receive module (e.g., RF module 26). For example, such co-location may accommodate charge control, voltage regulation, and energy storage/ripple filtering while substantially eliminating larger, heavier, expensive devices (e.g., Power Control and Distribution Modules, Power Boost Regulators, and Power Processing Units) used to perform such tasks. Also, ICU 20 may substantially reduce the need for thermal control systems that also add significant cost, complexity, and size. For example, the prior centralized power distribution systems often required dedicated thermal control systems to dissipate heat. These thermal control systems often added to the cost, complexity and size of the overall power distribution system.

Another advantage lends itself to the assembly of ICU 20. For example, each component may be manufactured identically without requiring connection to a centralized power distribution system. Each component may therefore be mass produced less expensively than prior components because, among other reasons, economies of scale. Moreover, because each ICU 20 is identical, a system configured with ICUs 20 may enjoy certain maintenance features. For example, ICUs may be manufactured as line replaceable units in the event that one or more of a system's ICUs fail.

Figure 11:
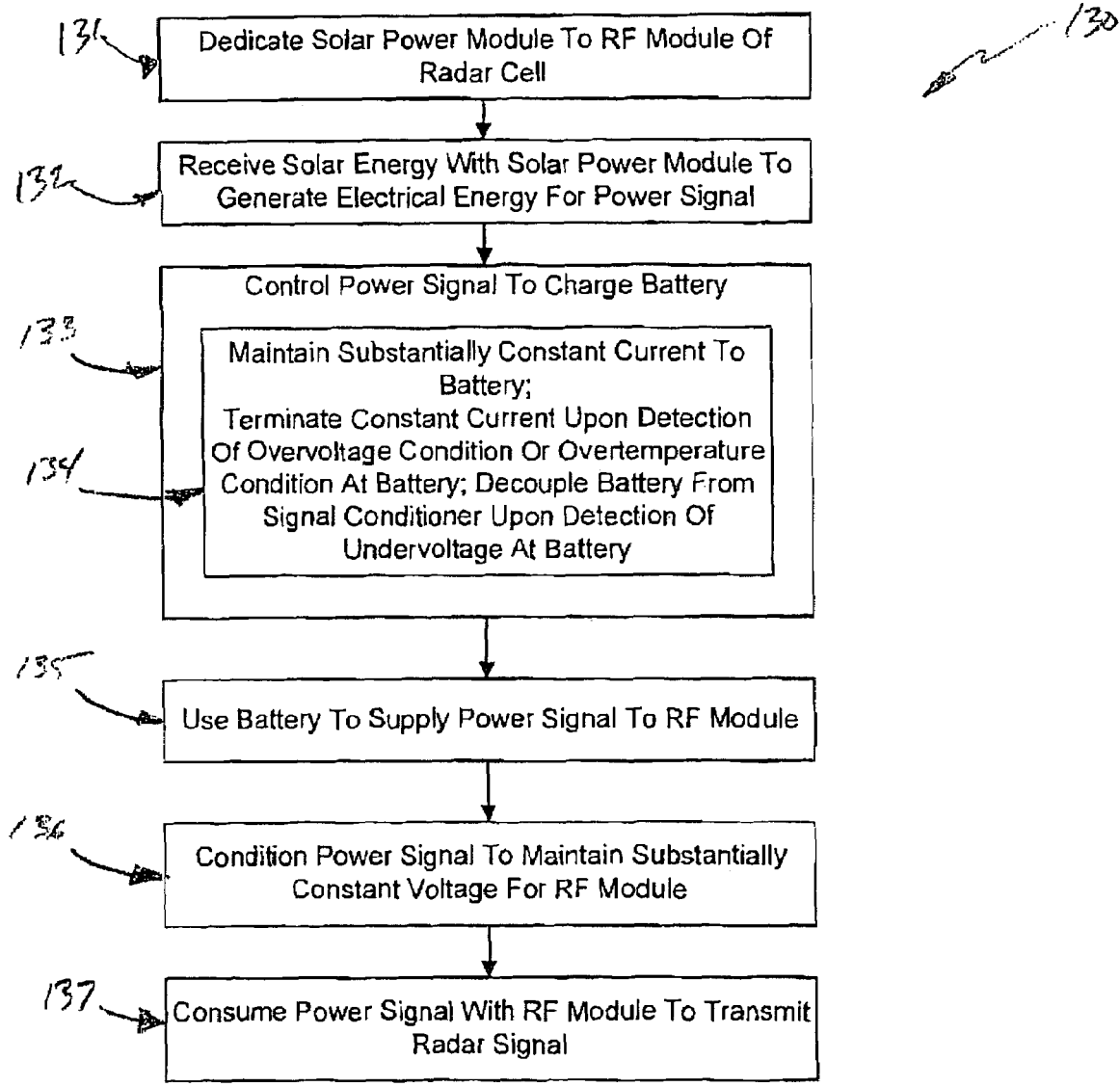
FIG. 11 is a flowchart illustrating a process in one exemplary embodiment in the invention.

FIG. 11 is flowchart illustrating process 130 in one exemplary embodiment in the invention. Process 130 initiates with the dedication of a solar power module to an RF module of a radar cell, in process element 131. For example, a solar cell configured with the solar power module may convert solar energy to electrical energy, in process element 132. The electrical energy may be dedicated to at least one RF module, such as RF module 26 hereinabove. The RF module may be a transmit/receive module that forms a cell (e.g., one component) of a larger radar system, such as a SAR.

The generated electrical energy is used to form an electric power signal. The electric power signal is used to charge a battery, such as battery 24 hereinabove, from which the RF module may draw electrical power. Just as the solar power module was dedicated to the RF module, so may be the control of the power signal and the electrical energy storage thereof, in process element 133. For example, an ICU, such as ICU 20 hereinabove, may include a battery charger that maintains a substantially constant current to the battery. This battery charger may terminate the constant current to the battery and/or decouple from the battery upon detection of one or more conditions (e.g., over voltage, overtemperature, and/or under voltage) at the battery, in process element 134.

Once the battery is at least partially charged, the battery may be used to supply power to the RF module, in process element 135. Prior to transferring a power signal from the battery, the signal may be conditioned to maintain a substantially constant voltage for the RF module, in process element 136. For example, as the RF module consumes electrical energy of a power signal from the battery, the power signal may be conditioned using a voltage regulator such as voltage regulator 40 hereinabove. The voltage regulator may maintain a substantially constant voltage from the battery to the RF module. The signal conditioning may also include providing a power signal to a charge storage unit, such as charge storage unit 42 hereinabove, to assist in maintaining a substantially constant voltage. The charge storage unit may also provide ripple filtering that removes high-frequency components of the power signal prior to consumption by the RF module.

Additionally, as part of process element 136, since the RF module may require negative voltage for reference, a voltage converter, such as voltage converter 41 hereinabove, may generate another power signal having a negative voltage from the electrical energy of the battery. This negative voltage power signal may be delivered to the RF module for reference.

After the power signal is conditioned, the RF module may use the power signal to transmit a radar signal, in process element 137. For example, the RF module may consume electrical energy of the power signal to generate and transmit a plurality of electromagnetic pulses that are used in radar processing. One example of such a radar may include a SAR. The RF module may also consume electrical energy to receive electromagnetic pulses as they are reflected to the RF module.

While the invention has been illustrated and described in detail in the drawings and foregoing description, such illustration and description is to be considered as exemplary and not restrictive in character. Accordingly, it should be understood that only the preferred embodiment and minor variants thereof have been shown and described and that all changes and modifications that come within the spirit of the invention are desired to be protected.

What is claimed is:

1. A system that supplies power to a radar antenna onboard a space vehicle, said system comprising:
a plurality of antenna modules of the radar antenna onboard the space vehicle, wherein each antenna module includes:
a radio frequency module,
a dedicated power cell that supplies a power signal to the radio frequency module of the antenna module and includes a dedicated solar power module that generates electrical energy for the power signal, and
a dedicated signal conditioner coupled to the power cell and to the radio frequency module of the antenna module, the signal conditioner conditioning the power signal for use by the radio frequency module, wherein the radio frequency module receives conditioned power from the signal conditioner to use in processing a radio frequency signal, and wherein the signal conditioner includes a dedicated voltage regulator that regulates a voltage of the power signal, wherein the voltage regulator is configured with a single ended primary inductance converter topology that includes a processor and an inductor, the processor included in the voltage regulator configured to execute software instructions to detect characteristics of the power signal and transfer the detected characteristics to a central processing system of the space vehicle, and wherein the signal conditioner further includes a dedicated charge storage unit coupled to the voltage regulator to temporarily store the power signal thereby deterring voltage droop resulting from transmission of pulsed electromagnetic energy by the radio frequency module, the charge storage unit comprising an array of integrated circuit capacitors connected in parallel.

2. The system of claim 1, wherein the radio frequency module includes:
one or more radiating elements that transmit pulsed electromagnetic energy for use in radar processing; and
a receiver that receives pulsed electromagnetic energy reflected from a target.

3. The system of claim 1, wherein the receiver is a Synthetic Aperture Radar receiver.

4. The system of claim 1, wherein the power cell further includes:
a dedicated battery that supplies the power signal, wherein the battery is coupled to the signal conditioner; and
a dedicated battery charger coupled to the solar power module and to the battery to charge the battery with electrical energy generated by the solar power module.

5. The system of claim 4, wherein the battery comprises a lithium electrochemical battery.

6. The system of claim 4, wherein the battery charger includes a processor that controls charging of the battery by providing the battery a substantially constant level of electrical energy from the solar power module and by terminating charging of the battery upon detection of an over-temperature condition at the battery, wherein the processor is further configured to decouple the battery from the signal conditioner upon detection of an under-voltage condition at the battery.

7. The system of claim 1, wherein a combined capacitance of the array of integrated circuit capacitors connected in parallel is at least 8,500 microfarads.

8. The system of claim 7, wherein the signal conditioner further includes a dedicated voltage converter coupled to the voltage regulator and to the radio frequency module, wherein the voltage converter receives the power signal and generates a negative voltage power signal therefrom for supply to the radio frequency module, and wherein the voltage converter includes a processor that provides a status of the system.

9. A method of supplying power to a radar antenna that includes a plurality of radio frequency modules, the radar antenna being onboard a space vehicle, said method comprising the steps of:
- associating one solar power module of a plurality of solar power modules with one radio frequency module of the radar antenna onboard the space vehicle;
- receiving solar energy with the solar power module to generate electrical energy for a power signal;
- controlling the power signal to charge a battery;
- using the battery to supply the power signal to the associated radio frequency module;
- conditioning the power signal to maintain a substantially constant voltage for the associated radio frequency module, wherein said conditioning employs a voltage regulator configured with a single ended primary inductance converter topology that includes a processor and an inductor, and wherein said conditioning includes temporarily storing at least a portion of the power signal in an array of integrated circuit capacitors connected in parallel to deter voltage droop with the associated radio frequency module;
- executing software instructions on the processor to detect characteristics of the power signal and transfer the detected characteristics to a central processing system of the space vehicle; and
- consuming the power signal with the associated radio frequency module to process a radar signal.

10. The method of claim 9, wherein in said step of temporarily storing, a combined capacitance of the array of integrated circuit capacitors connected in parallel is at least 8,500 microfarads.

11. The method of claim 9, wherein conditioning the power signal includes converting at least a portion of the power signal to a negative voltage power signal for supply to the associated radio frequency module.

12. The method of claim 9, wherein controlling the power signal includes:
- maintaining a substantially constant current to the battery;
- terminating said substantially constant current to the battery upon detection of an over-temperature condition at the battery; and
- decoupling the battery from the signal conditioner upon detection of an under-voltage condition at the battery.

13. The method of claim 9, wherein the battery comprises a lithium electrochemical battery.

14. The method of claim 9, further comprising associating additional solar power modules with additional radio frequency modules of the radar antenna.

15. The method of claim 9, wherein the radar signal comprises a plurality of Synthetic Aperture Radar pulses and wherein the method further comprises processing the radar signal, wherein said processing the radar signal includes transmitting the radar signal and receiving a reflected radar signal, and combinations thereof.

16. A system that supplies power to a radar antenna onboard a space vehicle, comprising:
- a plurality of radar cells of the radar antenna onboard the space vehicle, wherein each radar cell includes a radio frequency module and a solar power module;
- means for dedicating the solar power module to the radio frequency module of the radar cell;
- means for receiving solar energy to generate electrical energy for a power signal, the power signal being dedicated to the radio frequency module;
- means for controlling the power signal to charge a battery;
- means for using the battery to supply the power signal to the radio frequency module;
- means for conditioning the power signal to maintain a substantially constant voltage for the radio frequency module, wherein said means for conditioning employ voltage regulation means configured with a single ended primary inductance converter topology that includes processing means and inductive means, and wherein said means for conditioning further employ means for temporarily storing at least a portion of the power signal in an array of integrated circuit capacitors connected in parallel to deter voltage droop with the associated radio frequency module;
- software instructions executable by said processing means to detect characteristics of the power signal and transfer the detected characteristics to a central processing system of the space vehicle; and
- means for consuming the power signal with the radio frequency module to transmit a radar signal.

17. The system of claim 16, wherein the battery comprises a lithium electrochemical battery.

18. The system of claim 16, further comprising additional means for receiving solar energy to generate electrical energy for additional power signals, each additional power signal being dedicated to one of a plurality of additional radio frequency modules of the radar antenna.

* * * * *